Oct. 15, 1963     S. J. HUSS     3,107,347
MAGNETIC FIELD COMPENSATION MEANS
Filed July 10, 1961

INVENTOR
STEVEN J. HUSS
BY Herbert F. Somermeyer
ATTORNEY

United States Patent Office 3,107,347
Patented Oct. 15, 1963

3,107,347
MAGNETIC FIELD COMPENSATION MEANS
Steven J. Huss, Minneapolis, Minn., assignor to Sperry Rand Corporation, New York, N.Y., a corporation of Delaware
Filed July 10, 1961, Ser. No. 122,979
3 Claims. (Cl. 340—174.1)

This invention relates generally to improvements in signal revolving circuits and especially to such circuits having close spacing between simultaneously operated recording and readback transducers.

In information revolving circuits of the type utilizing magnetic record mediums in some cases it is desirable to have a short spacing between the recording and readback heads in order to make the delay time small with a reasonable surface velocity of the record medium. One problem encountered in placing the recording head, which contains relatively large current amplitudes especially for non-contact type of digital recording, close to the readback head is the leakage flux which is intercepted by the readback head coil and appears as a noise signal. This invention obviates this problem in "short" revolver circuits by placing a second coil in parallel circuit with the recording head coil and physically disposed such that the readback head is intermediate the two current carrying coils. The coils are arranged such that the leakage flux caused by the recording currents from the respective heads cancel each other in the readback coil area. Accordingly, insubstantial signals are induced in the readback circuitry due to recording currents.

It is a prime object of this invention to provide improved revolver circuits having magnetic recording mediums and which provide a short time delay.

It is another object of this invention to provide in a revolver circuit close spacing of the recording and readback heads without the necessity of shielding the heads from each other.

These and other more detailed and specific objects will be disclosed in the course of the following specification, reference being had to the accompanying drawings, in which.

Figure 1:
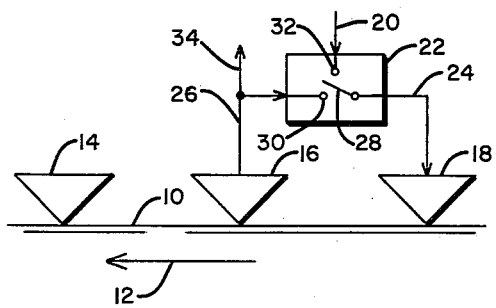
FIG. 1 is a schematic showing of a typical revolver circuit.

Referring now to FIG. 1, there is illustrated a usual revolver circuit arrangement having a magnetizable surface 10 moving in the direction of the arrow 12 with respect to the magnetic transducers 14, 16, and 18. It is understood the medium 10 may close upon itself to form an endless belt or magnetic drum configuration. Signals to be recorded can be furnished over the line 20 to a control unit 22 which directs the signals over the line 24 to the recording transducers 18. The signals as recorded on the medium 10 are carried thereby to the readback transducers 16 and produce a voltage therein which is transferred over the line 26 to the control circuit 22. The erase head 14 erases the signals from the medium 10 after the signals have been detected by the head 16. The control circuit 22 can be a switch having a switch arm 28 movable between the terminals 30 and 32 for respectively applying the readback signals from transducer 16 or the signals to be recorded on the line 20 to the recording transducer 18. Alternately the signals from transducer 16 can be provided to utilization equipment (not shown) over the line 34.

It is apparent that the signal delay provided by the FIG. 1 revolver circuit is a function of the surface velocity of the medium 10 and the spacing between the transducers 16 and 18. To provide a minimum time delay, it is preferable to place the transducers 16 and 18 in close proximity for minimizing the velocity of the medium 10. As an example, in recording systems having a red oxide surface and utilizing non-contact recording with two mils head-to-medium spacing and a record velocity of about 1500 inches per second with a recording density of 80 pulses per inch, a one-inch spacing will provide a time delay of 80-digit positions. It is well known that most computing apparatus have word lengths much less than 80-digit positions, for example 20-digit positions. If the heads 16 and 18 are moved closer than one inch, there is provided sufficient mutual inductance between the respective coils (not shown) therein to provide severe crosstalk in the reproducing or readback head. Remember that in a revolver circuit the read or signal recovery operation is performed simultaneously with the recording operation.

Figure 2:
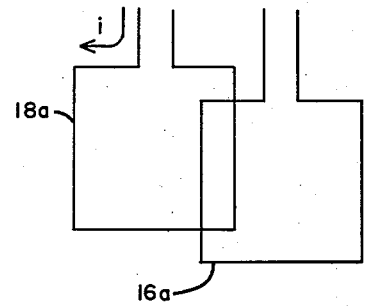
FIG. 2 is a diagrammatic presentation of the relationship between the record and readback heads in a revolver having short spacing therebetween.

Referring now to FIG. 2, the coil 18a represents the recording coil in transducer 18 while the coil 16a represents a readback coil in transducer 16. As a current $i$ flows through the coil 18a, magnetic flux is provided which is intercepted by the coil 16a in proportion to the increase of the spacing therebetween. In a test conducted with readback and record heads having ferrite cores with a 1–15 step-up voltage transformer for output of the readback head, the voltage induced in the coil 16a due to the mutual inductance with coil 18a was 415 millivolts. Using the criteria set forth above for the non-contact recording, the signal recovered by the coil 16a from medium 10 has a maximum value of 300 millivolts. From this it is apparent that the desired spacing of one-fourth inch between the two heads provides an intolerable signal recovery situation.

Figure 3:
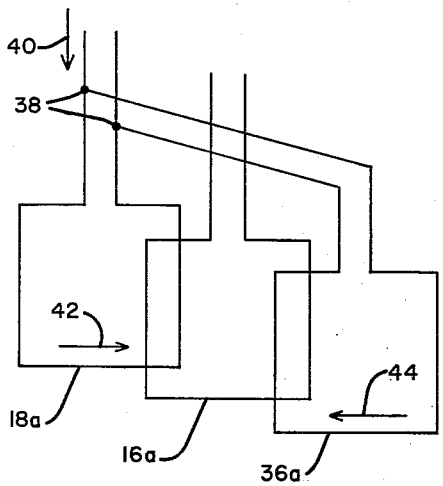
FIG. 3 is a diagrammatic showing of the coils in the revolver circuit constructed according to the teachings of this invention.

Referring now to FIG. 3, the same diagrammatic representation is used as that in FIG. 2 wherein the loop 18a represents the recording head coil and 16a represents the reproducing head coil. Attached in parallel to the coil 18a is a second coil 36a disposed such that it has the read coil 16a exactly intermediate and symmetrical with respect to the coils 18a and 36a. Note the connections at 38 are such that a current provided in the direction of the arrow 40 will flow in the direction of the arrow 42 in loop 18a and in the opposite direction as indicated by the arrow 44 in loop 36a. Since the currents are flowing in the opposite directions with respect to the loop 16a, it is apparent the magnetic fluxes provided thereby will oppose each other providing opposing and cancelling voltages in the loop 16a. In a test conducted using the general arrangement of FIG. 3 with a one-fourth inch spacing and the non-contact type of recording referred to above, the signal induced in the winding 16a due to the recording current was reduced to only 25 millivolts from the previous level of 415 millivolts. A second test was conducted whereby the coils 18a and 36a were placed in series circuit relationship and maintaining the same physical relationship, the reduction in noise was noted to be the same.

Figure 4:
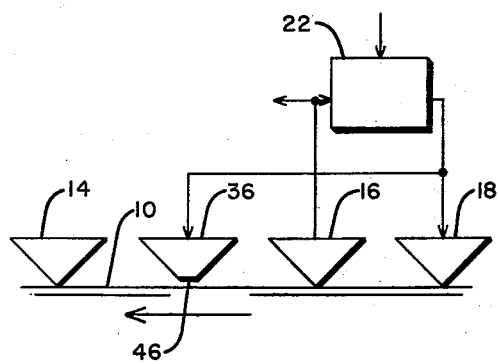
FIG. 4 is a schematic showing of a revolver circuit constructed according to this invention.

Referring now to FIG. 4, a revolver circuit utilizing this invention has the erase head 14 with transducers 16 and 18 for providing the revolving function in conjunction with the control circuit 22 and additionally has a nonrecording transducer 36 disposed downstream from the readback or reproducing transducer 16. By providing no gap in the ferrite core (not shown) of the transducer 36, it will not record on the medium 10. This is indicated schematically by the truncation 46.

From reading the above description, it should be apparent that the transducers 18 and 36 should have the same degree of shielding with respect to the transducer 16, yet it is not required that the shielding be fully effective because of the flux cancellation in the reproducing coil 16a of the transducer 16. It is also important that the coil 16a be wound symmetrical with respect to the recording coil 18a and the extra compensating coil 36a.

It is understood that suitable modifications may be made in the structure as disclosed provided such modifications come within the spirit and scope of the appended claims.

Having now, therefore, fully illustrated and described my invention, what I claim to be new and desire to protect by Letters Patent is:

1. A revolver circuit having a recording and readback head disposed in juxtaposition to a moving magnetizable member with the reproducing head being downstream with respect to the recording head, the heads being spaced in close proximity and each having coils being intercoupled by mutual inductance such that a recording current in the recording coil induces a substantial voltage in the reproducing head coil, a third coil disposed downstream from the reproducing head and being in a non-recording relationship to the magnetizable member and having mutual inductance with the reproducing head coil, and the third coil being electrically connected to the recording head coil such that recording current will flow through both the head and the third coil such that the resulting fluxes cancel each other in the reproducing head because of the mutual inductances.

2. Apparatus as in claim 1 wherein the spacing between the reproducing head and the recording head and the third coil are equal, and the reproducing head is symmetrically constructed with respect to the third coil and the recording head.

3. Apparatus as in claim 1 further including control means associated with the reproducing and recording heads for selectively circulating signals from the reproducing head to the recording head for translation through the magnetizable member.

References Cited in the file of this patent

UNITED STATES PATENTS 2,351,008     Camras _____ June 13, 1944
2,689,274     Saeger _____ Sept. 14, 1954

OTHER REFERENCES

RCA Technical Notes No. 398 (2 pages), June 1960.